(12) United States Patent
Sato et al.

(10) Patent No.: US 8,438,842 B2
(45) Date of Patent: May 14, 2013

(54) EXHAUST GAS PURIFICATION DEVICE

(75) Inventors: Minoru Sato, Tokyo (JP); Sho Shiraga, Tokyo (JP); Kazuhiko Kawajiri, Tokyo (JP); Masato Kurahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 856 days.

(21) Appl. No.: 12/410,708

(22) Filed: Mar. 25, 2009

(65) Prior Publication Data
US 2009/0249772 A1    Oct. 8, 2009

(30) Foreign Application Priority Data

Apr. 8, 2008   (JP) ................................ 2008-100227
Sep. 26, 2008  (JP) ................................ 2008-247031

(51) Int. Cl.
*F01N 3/02*    (2006.01)

(52) U.S. Cl.
USPC .................... 60/320; 60/275; 60/298; 60/301

(58) Field of Classification Search ............... 60/275, 60/301, 285
See application file for complete search history.

(56) References Cited

U.S. PATENT DOCUMENTS

| 5,746,984 A * | 5/1998 | Hoard ............................. 422/169 |
| 6,247,303 B1 * | 6/2001 | Broer et al. ..................... 60/274 |
| 6,887,438 B2 * | 5/2005 | Labarge et al. ............... 422/177 |
| 6,955,041 B2 * | 10/2005 | Takeshima et al. ............. 60/275 |
| 7,043,902 B2 * | 5/2006 | Nakanishi et al. .............. 60/286 |
| 7,207,169 B2 * | 4/2007 | Nakanishi et al. .............. 60/275 |

FOREIGN PATENT DOCUMENTS

| EP | 1 239 126 B1 | 7/2004 |
| EP | 1 309 390 B1 | 3/2005 |
| EP | 1 662 105 B1 | 4/2008 |
| JP | 6-010652 A | 1/1994 |
| JP | 7-317535 | 12/1995 |
| JP | 11-057413 A | 3/1999 |
| JP | 2001-525902 A | 12/2001 |
| JP | 2002-256853 | 9/2002 |
| JP | 2004-305841 | 11/2004 |
| JP | 2007-192058 A | 8/2007 |

OTHER PUBLICATIONS

German Office Action issued Mar. 4, 2011, in Patent Application No. 10 2009 014 458.7 (with English-language translation).
Office Action issued Sep. 13, 2011, in Japanese Patent Application No. 2008-247031 filed Sep. 26, 2008 (with English translation).

* cited by examiner

*Primary Examiner* — Thomas Denion
*Assistant Examiner* — Diem Tran
(74) *Attorney, Agent, or Firm* — Oblon, Spivak, McClelland, Maier & Neustadt, L.L.P.

(57) ABSTRACT

An exhaust gas purification device is provided. The device includes: in an exhaust gas passage for a combustion exhaust gas containing a nitrogen oxide, a hydrocarbon, and an oxygen in a larger amount than a theoretical reaction amount with respect to the hydrocarbon to flow therethrough, in order from upstream, a first catalyst part for selectively reducing a nitrogen oxide; a plasma discharge part for generating a plasma; a second catalyst part for selectively reducing a nitrogen oxide; and a purifying catalyst part for purifying a reducing agent.

11 Claims, 5 Drawing Sheets

EXHAUST GAS PURIFICATION DEVICE

BACKGROUND OF THE INVENTION

1. Field of the Invention

The present invention relates to an exhaust gas purification device for purifying harmful components in an exhaust gas discharged from an internal combustion engine, a combustion device, or the like.

2. Description of the Related Art

An exhaust gas discharged from an internal combustion engine such as an engine or a combustion device generally contains therein nitrogen oxide ($NO_x$), carbon monoxide (CO), hydrocarbon (HC), and the like as harmful components. As a related-art exhaust gas purification device for purifying an exhaust gas generated by stoichiometric combustion in which the amount of the residual oxygen ($O_2$) in the exhaust gas is very small, a device using a three-way catalyst has gone into practical use. Contact of the exhaust gas discharged from an engine with the three-way catalyst converts the harmful components contained in the exhaust gas into harmless components such as water ($H_2O$), carbon dioxide ($CO_2$), and nitrogen ($N_2$).

In recent years, in engines for cars, attention has focused on a lean-burn engine having a system for combustion with a gasoline in a smaller amount than usual in order to improve the fuel efficiency. The lean-burn means lean combustion. The exhaust gases discharged from an internal combustion engine such as the lean burn engine or a diesel engine, or the exhaust gases from industrial combustion devices, household fan heaters, or the like contain therein a large amount of oxygen. Thus, with the foregoing method using a three-way catalyst, it is difficult to purify nitrogen oxide ($NO_x$) which is one of harmful components.

As the method for purifying such an exhaust gas containing a large amount of oxygen, for example, there is disclosed an exhaust gas purification device including a first three-way catalyst part, a plasma discharge part, and a second three-way catalyst part from upstream of a discharge gas passage (e.g., see JP-A-7-317535 (pages 3 and 4, FIG. 1)). Whereas, as another method, there is disclosed a discharge gas purification device including an oxidizing catalyst part, a plasma discharge part, and a $NO_x$ occlusion reduction catalyst part from upstream of a discharge gas passage (e.g., see JP-A-2002-256853 (page 3, FIG. 1)). Further, there is disclosed a discharge gas purification device including a plasma discharge part, a first reduction purification catalyst part, and a second reduction purification catalyst part from upstream of a discharge gas passage (e.g., see JP-A-2004-305841 (page 3, FIG. 1)).

However, with the related-art exhaust gas purification device including a first three-way catalyst part, a plasma discharge part, and a second three-way catalyst part from upstream of a discharge gas passage, when oxygen is contained in a large amount in the discharge gas, the oxidation reaction with $O_2$ of a reducing agent proceeds more preferentially than the reduction reaction of $NO_x$ at the first three-way catalyst part using platinum or rhodium as a catalyst. Accordingly, most of the hydrocarbons serving as a reducing agent required for purification of $NO_x$ at the plasma discharge part are consumed. As a result, to the plasma discharge part present at downstream of the catalyst parts, hydrocarbons to be a reducing agent are not supplied. Therefore, at the plasma discharge part, OH* (OH radical) and O* (O radical) having a high oxidizing power are generated by the plasma reaction of oxygen or water vapor in the exhaust gas. Thus, unfavorably, it becomes difficult to reduce and purify $NO_x$ only by the plasma reaction (in the formula, * means that atoms or molecules are in an excited state).

Whereas, with the related-art discharge gas purification device including an oxidizing catalyst part, a plasma discharge part, and a $NO_x$ occlusion reduction catalyst part from upstream of a discharge gas passage, hydrocarbons are oxidized and consumed at the oxidation catalyst part at the uppermost stream part. Thus, hydrocarbons to be a reducing agent are not supplied to the plasma processing part situated at downstream thereof. Thus, at the plasma discharge part, OH* (OH radical) and O* (O radical) having a high oxidizing power are generated by the plasma reaction of oxygen or water vapor in the exhaust gas. Thus, unfavorably, it becomes difficult to reduce and purify $NO_x$ only by the plasma reaction.

SUMMARY OF THE INVENTION

This invention was made in order to solve the foregoing problem. It is therefore an object of the invention to provide a discharge gas purification device which can prevent the consumption, upstream of the plasma discharge part, of the hydrocarbons serving as a reducing agent required at the plasma discharge part, and can effectively reduce and purify $NO_x$ by the reducing agent fed from upstream at the plasma discharge part.

According to an aspect of the present invention, there is provided an exhaust gas purification device comprising: in an exhaust gas passage for a combustion exhaust gas containing a nitrogen oxide, a hydrocarbon, and an oxygen in a larger amount than a theoretical reaction amount with respect to the hydrocarbon to flow therethrough, in order from upstream, a first catalyst part for selectively reducing a nitrogen oxide; a plasma discharge part for generating a plasma; a second catalyst part for selectively reducing a nitrogen oxide; and a purifying catalyst part for purifying a reducing agent.

Further, the temperatures of the first catalyst part and the second catalyst part are set at a lower temperature than a temperature at which a purification ratio of the nitrogen oxide in the flowing combustion exhaust gas becomes a maximum value.

According to the above configuration, at the uppermost stream part, a first catalyst part (first nitrogen oxide selective reducing catalyst part) is disposed. For this reason, hydrocarbons in the discharge gas, especially, hydrocarbons having a high reactivity (e.g., formaldehyde and acetaldehyde) can be first effectively used for reduction of $NO_x$.

Further, the temperature of the first catalyst part (first nitrogen oxide selective reducing catalyst part) is set at a lower temperature than the temperature at which the purification ratio of the flowing nitrogen oxides becomes the maximum value, i.e., at a lower temperature at which the entire amount of hydrocarbons in the combustion exhaust gas are oxidized. This can prevent consumption of the entire amount of hydrocarbons required for reducing and purifying $NO_x$ at the downstream plasma discharge part at the first nitrogen oxide selective reducing catalyst part. As a result, at the plasma discharge part, low reactive hydrocarbons (e.g., saturated hydrocarbons such as propylene and aromatic hydrocarbons) fed from upstream are converted into more highly reactive hydrocarbons by radicals generated by the plasma reaction. Thus, the second nitrogen oxide selective reducing catalyst part disposed downstream of the plasma discharge part is disposed. The temperature of the second nitrogen oxide selective reducing catalyst part is set at a lower temperature than the temperature at which the entire amount of hydrocarbons in the flowing combustion exhaust gas are oxidized. Therefore, at the second nitrogen oxide selective reducing catalyst part, $NO_x$ can be effectively reduced and purified. Further, at the reducing agent purification catalyst part downstream thereof, the residual HC and $NO_x$ can be allowed to react, thereby to purify harmful components in the combustion exhaust gas at a high ratio.

BRIEF DESCRIPTION OF THE DRAWINGS

Embodiments of the present invention will be described in detail based on the following figures, wherein.

DETAILED DESCRIPTION OF THE INVENTION

Embodiment 1

Figure 1:
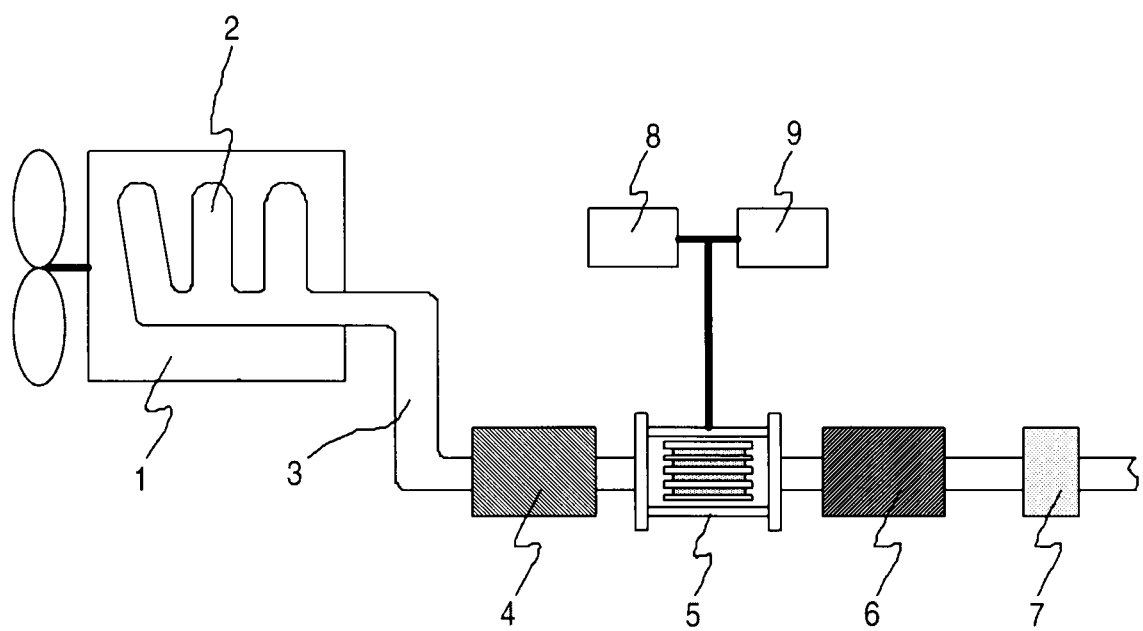
FIG. 1 is a block view of an exhaust gas purification device in Embodiment 1 of this invention.

FIG. 1 is a block view of an exhaust gas purification device in accordance with Embodiment 1 for carrying out this invention, and shows the state of the device being connected to, for example, an engine for a car. Engines for cars include, for example, a lean-burn engine for gasoline. In FIG. 1, several cylinders (not shown) are provided in the inside of an engine 1. An exhaust gas generated by burning fuel inside the cylinders is discharged from an exhaust manifold 2 connected to the cylinders to an exhaust gas passage 3 of one exhaust pipe. In the discharge gas passage 3, a cooling means (not shown) for cooling the discharge gas passage 3, such as a cooling fan or a running wind introduction device is set. Further, a first nitrogen oxide selective reducing catalyst part 4, a plasma discharge part 5, a second nitrogen oxide selective reducing catalyst part 6, and a reducing agent purification catalyst part 7, which form the exhaust gas purification device of this embodiment, are provided in this order from upstream of the exhaust gas passage 3. To the plasma discharge part 5, a plasma control device 8 and a high voltage power source 9 are connected. The plasma control device 8 monitors the state of generation of plasma of the plasma discharge part 5, and controls the high voltage power source 9 based on information such as the number of revolutions of the engine 1 and the exhaust gas temperature, and thereby controls the amount of plasma generated from the plasma discharge part 5.

For the first nitrogen oxide selective reducing catalyst part 4, the second nitrogen oxide selective reducing catalyst part 6, and the reducing agent purification catalyst part 7 in this embodiment, for example, the one including a catalyst carried on a faveolate honeycomb ceramic base material can be used. Examples of the catalysts for use in the first nitrogen oxide selective reducing catalyst part 4 and the second nitrogen oxide selective reducing catalyst part 6 include a silver catalyst carried on alumina regarded as effective for the purification reaction of nitrogen oxides for the ceramic base material and a silver catalyst carried on zeolite. These catalysts are not limited to silver catalysts so long as they have a function of selectively reducing a nitrogen oxide. For example, there are also applicable noble metals such as platinum, palladium, iridium, ruthenium, and gold, and porous catalysts such as porous alumina, zeolite, and titanium oxide. Whereas, as the catalyst to be used for the reducing agent purification catalyst part 7, catalysts carrying noble metals such as platinum, palladium, iridium, and ruthenium excellent in oxidation ability to hydrocarbons on alumina, zeolite, or the like are effective.

Figure 2:
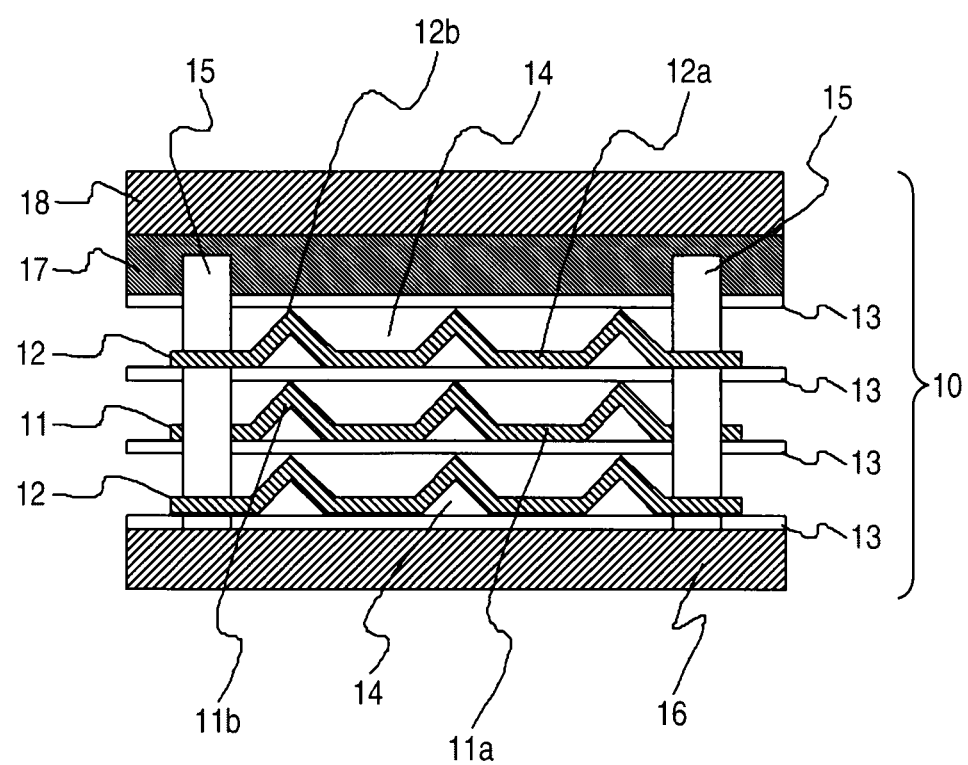
FIG. 2 is a schematic view of a plasma discharge part in Embodiment 1 of this invention.

FIG. 2 is a schematic cross sectional view of the plasma discharge part 5 in this embodiment. The plasma discharge part 5 is formed of a laminated body 10. The laminated body 10 is configured such that a high voltage electrode 11, ground electrodes 12, and plate-like dielectric bodies 13 formed of plate ceramics are alternately stacked one on another. A pair of the high voltage electrode 11 and the ground electrode 12 form a discharge electrode. For the high voltage electrode 11 and the ground electrode 12, for example, a punching metal made of stainless steel (a plate-like metal including fine pores formed therein) can be used. In the high voltage electrode 11 and the ground electrode 12, concaves and convexes formed of concave parts 11a and 12a and convex parts 11b and 12b, respectively, are alternately formed. The concave parts 11a and 12a are formed in a flat shape. The concave parts 11a and 12a and the convex parts 11b and 12b of these electrodes form gap parts 14 for allowing an exhaust gas to circulate therethrough between the adjacent dielectric bodies 13. A total of four support poles 15 are fixed and supported to be vertically arranged one in each vicinity of the corner parts of a rectangular fixing plate 16. Each dielectric body 13 is mounted in the direction orthogonal to the four support poles 15. Thereon, the high voltage electrode 11 is stacked so that the front support poles 15 are inserted through respective through holes (not shown) of the high voltage electrode 11. Then, the dielectric body 13 is mounted on the convex parts 11b of the high voltage electrode 11. Then, the ground electrode 12 is stacked so that the back support poles 15 are inserted into the same through holes (not shown) provided in the ground electrode 12. Subsequently, the high voltage electrodes 11 and the ground electrodes 12 are alternately stacked via the dielectric bodies 13 in the same manner. Thus, a pressure plate 18 is mounted on a prescribed number of the stacked layers via a heat insulation material 17 to form the laminated body 10.

As described above, by pressing the discharge electrode group stacked via the dielectric bodies 13 with the fixing plate 16 and the pressure plate 18, it is possible to fix all the members. For example, by inserting the laminated body 10 in a rectangular tube, it is possible to fix the stacked discharge electrode group, and simultaneously to use the tube as a part of piping of the exhaust gases. The material for the fixing plate 16 and the pressure plate 18 may be either of a metal or an insulation material. Whereas, for the heat insulation material 17, for example, glass wool or quartz wool can be used. In addition, cotton-like materials having elasticity, and having poor air permeability, and the like can be used. Alternatively, an array of closely arranged materials of steel wool or spring or the like is also acceptable.

Then, the operation of the exhaust gas purification device in this embodiment will be described.

First, the operation of the first nitrogen oxide selective reducing catalyst part 4 will be described. To the first nitrogen oxide selective reducing catalyst part 4, an exhaust gas from the engine 1 is introduced. Then, nitrogen oxides (which are hereinafter referred to as $NO_x$) contained in the exhaust gas, and hydrocarbons (which are hereinafter referred to as HC)

similarly contained in the exhaust gas, especially HC such as aldehydes or alcohols excellent in reactivity with nitrogen oxides react with each other. Thus, the purification treatment proceeds, so that $NO_x$ and HC are partially converted into $N_2$, $CO_2$ and $H_2O$.

Figure 3:
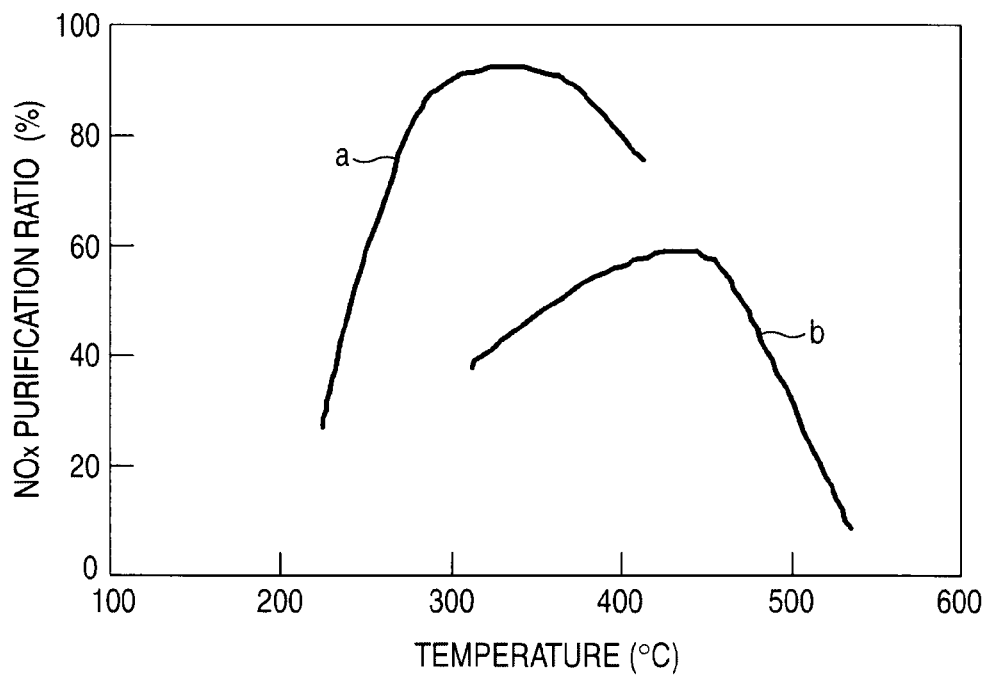
FIG. 3 is a characteristic view of a catalyst part in Embodiment 1 of this invention.
Figure 4:
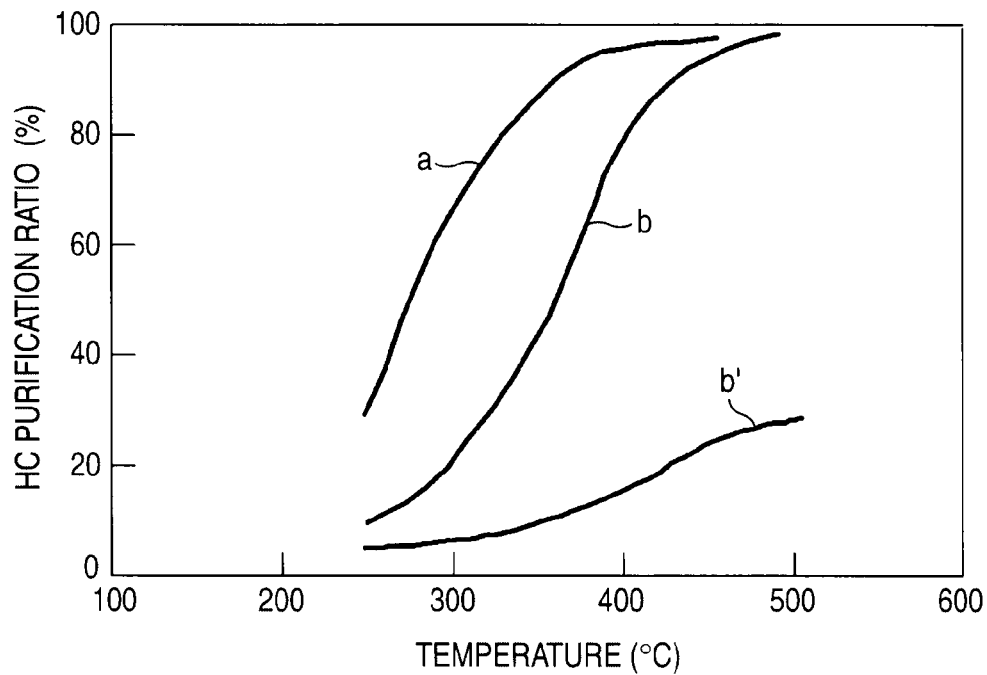
FIG. 4 is a characteristic view of the catalyst part in Embodiment 1 of this invention.

FIGS. 3 and 4 are characteristic views showing the relationships between the catalyst temperature and the $NO_x$ purification ratio and the HC purification ratio, respectively in the first nitrogen oxide selective reducing catalyst part 4 in accordance with the exhaust gas purification device of this embodiment. In FIGS. 3 and 4, the $NO_x$ purification ratio and the HC purification ratio are values expressed as the following equations:

$NO_x$ purification ratio (%)=(Catalyst part inlet $NO_x$ concentration−Catalyst part outlet $NO_x$ concentration)/(Catalyst part inlet $NO_x$ concentration)

HC purification ratio (%)=(Catalyst part inlet HC concentration−Catalyst part outlet HC concentration)/(Catalyst part inlet HC concentration)

FIGS. 3 and 4 each shows the purification ratio when a silver catalyst carried on alumina is used as the catalyst for use in the first nitrogen oxide selective reducing catalyst part 4. The characteristic curve indicated with a in the diagram is for the case where $NO_2$ is circulated as $NO_x$, and only acetaldehyde is circulated as HC serving as a reducing agent. FIG. 3 indicates that $NO_x$ is purified with efficiency when the temperature of the first nitrogen oxide selective reducing catalyst part 4 is about 320° C. Whereas, FIG. 4 indicates that an almost entire amount of acetaldehyde which is HC is oxidized when the temperature reaches about 400° C. Thus, the temperature is set at a high temperature at which a nearly entire amount of HC is oxidized. Then, for the reducing agent such as acetaldehyde which is highly reactive HC, the oxidation reaction of $O_2$+HC proceeds more preferentially than the selective reduction reaction of $NO_x$+HC. As a result, HC which is a reducing agent is consumed with the oxidation reaction with $O_2$, resulting in a reduction of the purification ratio of $NO_x$. Therefore, the temperature of the first nitrogen oxide selective reducing catalyst part 4 is set at a temperature at which the entire amount of HC are not oxidized, i.e., lower temperature than the temperature at which the $NO_x$ purification ratio of FIG. 3 shows the maximum value. This can attain a high $NO_x$ purification ratio without unproductive consumption of HC of the reducing agent. When the temperature of the first nitrogen oxide selective reducing catalyst part 4 is higher than the temperature at which the $NO_x$ purification ratio shows the maximum value, the cooling means set at the exhaust gas passage 3 is operated to cool the exhaust gas passage 3 and the exhaust gas. Thus, the temperature is reduced to be lower than the temperature at which the $NO_x$ purification ratio shows the maximum value.

On the other hand, the characteristic curves indicated with a curb b of FIG. 3, and a curb b and a curb b' of FIG. 4 show the characteristics when the exhaust gas from the engine 1 is caused to flow to the first nitrogen oxide selective reducing catalyst part 4. The curb b of FIG. 4 shows the purification ratio of acetaldehyde in the engine exhaust gas; and the curb b' shows the purification ratio of the entire HC contained in the engine exhaust gas. In the case of the exhaust gas from the engine 1, HC other than acetaldehyde contained in the exhaust gases at about 300° C., especially, HC having low reactivity with $NO_x$ is adsorbed on the catalyst surface to cause carbon precipitation. Thus, the reactivity of the catalyst is deteriorated. Therefore, as compared with the case where only aldehyde is caused to flow (characteristic curve a), the $NO_x$ purification ratio is smaller. At about 300° C. as with the curve b, the purification ratio of the entire HC is low. Thus, low reactive HC is resistant to oxidation, and hence are adsorbed on the catalyst surface to inhibit the reaction. Actually, the surface of the catalyst of the first nitrogen oxide selective reducing catalyst part 4 to which an engine exhaust gas has been caused to flow at about 300° C. may have been discolored in brown due to adhesion of carbon thereon. As for the carbon precipitation onto the catalyst surface due to HC having low reactivity with $NO_x$, by increasing the temperature of the catalyst part to as high as about 430° C., the oxidation reaction of low reactive HC is appropriately promoted, which can prevent the carbon precipitation. Accordingly, the $NO_x$ purification ratio most increases. The purification ratio of acetaldehyde at this temperature is about 90%. The purification ratio of the total HC (curve b') is about 20%. Although the entire amount of HC cannot be oxidized at the temperature of 430° C., the HC adsorbed on the catalyst surface are oxidized at 300° C. Therefore, discoloration into brown of the catalyst is not observed at 430° C.

Therefore, the exhaust gas from the engine 1 is caused to flow to the first nitrogen oxide selective reducing catalyst part 4, and the temperature of the first nitrogen oxide selective reducing catalyst part 4 is set at 430° C. Thus, the exhaust gas components are measured at the catalyst part outlet. As a result, aldehydes and alcohols, which are highly reactive hydrocarbons out of HC, react by the catalyst and almost disappear, and other HC than the hydrocarbons are detected. Even when almost the entire amount of highly reactive HC has been oxidized, other HC remains, and is supplied to the plasma discharge part 5 on the downstream side for use.

When the temperature of the first nitrogen oxide selective reducing catalyst part 4 is set at a temperature as high as about 500° C., as with the case where acetaldehyde is caused to flow (curve a), the oxidation reaction of highly reactive HC such as acetaldehyde and $O_2$ occurs preferentially. Therefore, the HC to react with $NO_x$ decreases in amount, resulting in a reduction of the $NO_x$ purification ratio. The temperature of the first nitrogen oxide selective reducing catalyst part 4 is not thus set at a temperature as high as about 500° C., but set at a lower temperature than about 430° C. at which the $NO_x$ purification ratio shows the maximum value. This can prevent unproductive consumption of highly reactive HC with $O_2$. When the temperature of the first nitrogen oxide selective reducing catalyst part 4 becomes a temperature as high as, for example, 500° C. or more, the cooling means set in the discharge gas passage 3 is operated. Thus, the temperature of the first nitrogen oxide selective reducing catalyst part 4 is set at a lower temperature than about 430° C. at which the $NO_x$ purification ratio shows the maximum value. This prevents unproductive consumption of HC of the reducing agent.

When the temperature of the first nitrogen oxide selective reducing catalyst part 4 becomes a temperature as low as about 380° C., the purification ratio of acetaldehyde decreases down to about 60% as indicated with the curve b. In this case, the highly reactive HC such as acetaldehyde not used in the first nitrogen oxide selective reducing catalyst part 4 can be used again at the downstream second nitrogen oxide selective reducing catalyst part 6.

Thus, the first nitrogen oxide selective reducing catalyst part 4 is disposed at the uppermost stream, and is set at a lower temperature than the temperature at which the $NO_x$ purification ratio shows the maximum value. As a result, the highly reactive hydrocarbons effective for reduction of $NO_x$ in the exhaust gas can be used efficiently.

Then, the operation of the plasma discharge part 5 will be described. An exhaust gas is caused to pass between the discharge electrodes of the plasma discharge part 5, and treated with plasma generated between the discharge electrodes. This causes dissociation as expressed with the following formulae in the oxygen molecules and water molecules in the exhaust gas. Incidentally, * in the formulae denotes that atoms or molecules are in an excited state.

$$O_2 \rightarrow 2O^*$$

$$H_2O \rightarrow H^* + OH^*$$

As shown in the following reaction formulae, O* and OH* react with low reactive saturated hydrocarbons or aromatic hydrocarbons, or NO, and finally they are converted into more highly reactive formaldehyde or acetaldehyde, $NO_2$, or the like.

$$HC + O^* (\text{or } OH^*) \rightarrow \text{Aldehyde or the like}$$

$$NO + O^* \rightarrow NO_2$$

In the plasma discharge part 5, the exhaust gas containing oxygen and water vapor therein is subjected to a discharge plasma treatment. As a result, the harmful gases (HC and $NO_x$) in the exhaust gas can be converted into a highly reactive reducing gas (aldehyde) and an oxidizing gas ($NO_2$) by the discharge chemical reaction expressed by the formulae. This results in an improvement of the exhaust gas purification function. Particularly, the discharge plasma treatment is effective for purification of the exhaust gas from an engine whose exhaust gas contains a large amount of oxygen.

A description will be given to the results of a test in which a simulated gas has been treated by using the plasma discharge part alone. As the simulated gas, there was used a gas containing nitrogen as a main component, and propylene as a low reactive hydrocarbon (HC): 3800 ppm (concentration expressed in terms of carbon=11400 ppmC expressed in terms of methane), and $O_2$: 1 vol %, and water: 10 vol %. Further, the temperature and the flow rate of the simulated gas in this test were set as follows: at the inlet of the plasma discharge part 5, gas temperature: 320° C. and gas flow rate: 15 L/min.

As the high voltage electrode 11 and the ground electrode 12, a punching metal made of stainless steel was used. The height of the convex parts 11b and 12b with respect to the concave parts 11a and 12a was set at 5 mm. As the dielectric body 13, plate ceramics made of closely packed alumina was used. Whereas, as the high voltage power source 9, a transformer having a sine wave output of a secondary side rated voltage of 15 kV was used. The frequency of the sine wave at this step was set at 60 Hz.

Figure 5:
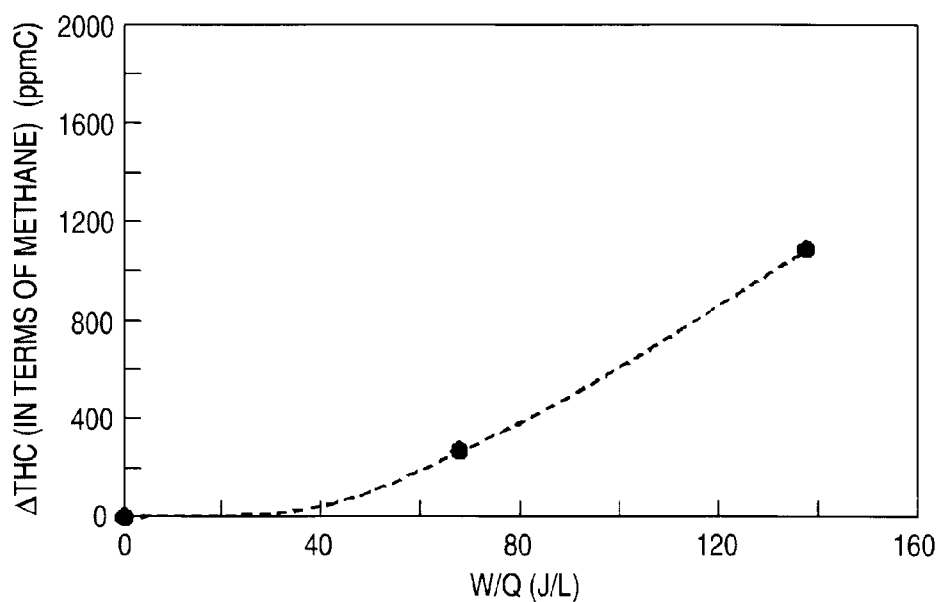
FIG. 5 is a characteristic view of the plasma discharge part in Embodiment 1 of this invention.

In this test, evaluation was performed based on the value of the discharge electric power W/Q (J/L) consumed for the treatment of every one liter of the simulated gas, wherein W (J/s) denotes the electric power consumed by discharge, and Q (L/s) denotes the airflow rate of the simulated gas. FIG. 5 is a characteristic view showing the relationship between the discharge electric power and the HC decomposition amount in this test. In FIG. 5, there is shown the relationship of the amount of decomposed HC expressed in terms of methane concentration of $\Delta THC$ (ppmC) with respect to W/Q (J/L). As apparent from FIG. 5, $\Delta THC$ increases in amount with an increase in W/Q, which promotes the decomposition of HC. The amount of decomposed HC $\Delta THC$ at a W/Q of 140 J/L is about 1150 ppmC, and the decomposition ratio is about 10%. Further, the measurement of the components of the gas at the outlet of the plasma discharge part 5 was carried out. As a result, acetaldehyde which is a highly reactive hydrocarbon was detected. This indicates that aldehyde effective for the catalyst reduction reaction of $NO_x$ is formed from propylene at the plasma discharge part 5.

Therefore, when the first nitrogen oxide selective reducing catalyst part 4 is set at about 430° C., the purification ratio of acetaldehyde is about 90%, and the amount of acetaldehyde supplied to the plasma discharge part 5 is small. However, the purification of the entire HC of the first nitrogen oxide selective reducing catalyst part 4 is about 20%. Thus, HC such as propylene is supplied to the plasma discharge part 5. At the plasma discharge part 5, it is possible to form highly reactive HC such as acetaldehyde from the propylene or the like.

Then, a description will be given to the operation of the second nitrogen oxide selective reducing catalyst part 6. To the second nitrogen oxide selective reducing catalyst part 6, an exhaust gas activated in the plasma discharge part 5, i.e., an exhaust gas containing acetaldehyde formed from propylene or the like is introduced. Then, as with the first nitrogen oxide selective reducing catalyst part 4, $NO_x$ contained in the exhaust gas and highly reactive HC such as aldehydes react with each other. Thus, the purification treatment proceeds, so that $NO_x$ and HC are partly efficiently converted into $N_2$, $CO_2$, and $H_2O$. The second nitrogen oxide selective reducing catalyst part 6 is set at a temperature lower than the temperature at which the purification ratio of nitrogen oxides shows the maximum value, i.e., at the temperature at which the entire amount of hydrocarbons are not oxidized. As a result, it is possible to efficiently use highly reactive hydrocarbons effective for reduction of $NO_x$ in the exhaust gas. This is similar with the first nitrogen oxide selective reducing catalyst part 4. Whereas, at the upstream plasma discharge part 5, heat generation associated with the plasma reaction also occurs. Therefore, it is preferable that the second nitrogen oxide selective reducing catalyst part 6 is disposed in the closest proximity to the plasma discharge part 5. This is also preferable from the viewpoint of preventing highly reactive hydrocarbons formed by the plasma reaction from being adsorbed on the wall surface of the exhaust gas passage 3 or the like. In the exhaust gas which has passed through the second nitrogen oxide selective reducing catalyst part 6, $NO_x$ has been mostly purified, and have been only partially left. The highly reactive hydrocarbons (such as aldehydes and alcohols) have been almost entirely eliminated, and other HC has been left.

Finally, the operation of the reducing agent purification catalyst part 7 will be described. The exhaust gas supplied to the reducing agent purification catalyst part 7 does not contain the highly reactive hydrocarbons (such as aldehydes and alcohols), but is a gas containing other hydrocarbons left therein, in which a slight amount of $NO_x$ also remain. In order to completely oxidize and purify hydrocarbons (HC) in the exhaust gas, the catalyst of the reducing agent purification catalyst part 7 is desirably a catalyst of a platinum type metal excellent in oxidation ability. A platinum catalyst or a palladium catalyst carried on alumina is preferable because it is excellent in oxidation reaction of HC and $O_2$. The following could be confirmed: when a platinum catalyst carried on alumina is used as the catalyst of the reducing agent purification catalyst part 7, almost the entire amount of HC is oxidized and purified by setting the temperature at 300° C. or more. The $NO_x$ purification ratio of the platinum catalyst is not as high as that of the silver catalyst. However, some $NO_x$ is purified in the process of oxidation of HC. Therefore, the $NO_x$ purification ratio is also somewhat improved. Incidentally, when a silver catalyst having poor oxidation ability of HC than that of a platinum catalyst is used as the catalyst of the reducing agent purification catalyst part 7, it is possible to improve the oxidation ability of HC for purification by setting the operation temperature high.

As described above, with the exhaust gas purification device in this embodiment, the first nitrogen oxide selective reducing catalyst part is disposed in the uppermost stream. Therefore, hydrocarbons, especially, highly reactive hydrocarbons (such as formaldehyde and acetaldehyde) in an exhaust gas can be first effectively used for reduction of $NO_x$. Further, the temperature of the first nitrogen oxide selective reducing catalyst part is set at a lower temperature than the temperature at which the purification ratio of nitrogen oxides shows the maximum value, i.e., the temperature at which the entire amount of hydrocarbons in the combustion exhaust gas are not oxidized. Thus, by making maximum use of the highly reactive hydrocarbons, $NO_x$ is reduced. Then, at the subsequent plasma discharge part, low reactive hydrocarbons are converted into highly reactive hydrocarbons. At the subsequent second nitrogen oxide selective reducing catalyst part, residual $NO_x$ is efficiently reduced with highly reactive hydrocarbons. At the lowermost stream reducing agent purification catalyst part, the entire amount of residual hydrocarbons are allowed to react to purify harmful gases. Therefore, it is possible to improve the purification ratio of the harmful components contained in the exhaust gas.

Embodiment 2

Figure 6:
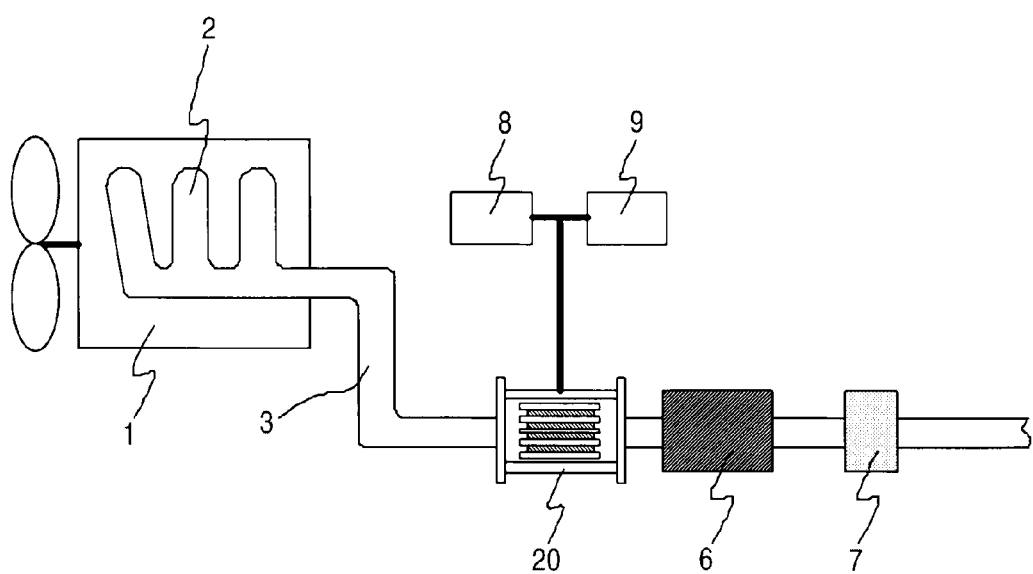
FIG. 6 is a block view of an exhaust gas purification device in Embodiment 2 of this invention.

FIG. 6 is a block view of an exhaust gas purification device in accordance with Embodiment 2 for carrying out this invention, and shows the state of the device being connected to, for example, an engine for a car. In this embodiment, a catalyst plasma integral part 20 including the first nitrogen oxide selective reducing catalyst part and the plasma discharge part described in Embodiment 1 integrated therein is provided in place of them in the exhaust gas passage 3. In the exhaust gas passage 3, the catalyst plasma integral part 20, the second nitrogen oxide selective reducing catalyst part 6, and the reducing agent purification catalyst part 7 are provided in this order from upstream. To the catalyst plasma integral part 20, the plasma control device 8 and the high voltage power source 9 are connected. The plasma control device 8 monitors the state of generation of plasma of the catalyst plasma integral part 20, and controls the high voltage power source 9 or the like based on information such as the number of revolutions of the engine 1 and the exhaust gas temperature, and controls the amount of plasma generated from the catalyst plasma integral part 20.

Figure 7:
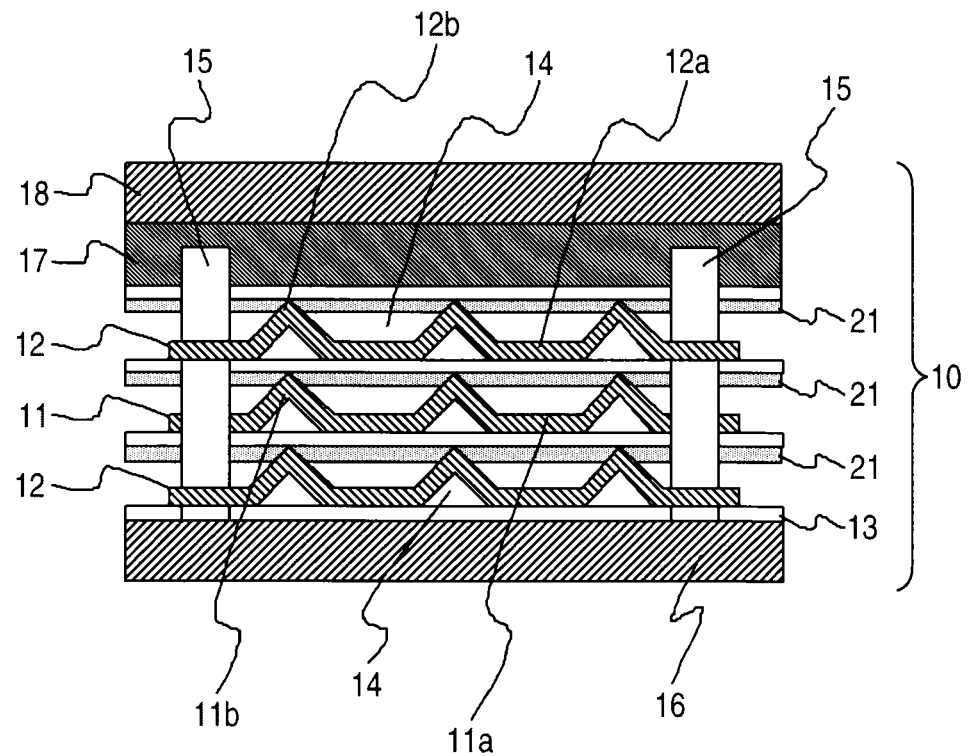
FIG. 7 is a schematic view of a plasma discharge part in Embodiment 2 of this invention.

FIG. 7 is a schematic cross sectional view of the catalyst plasma integral part in this embodiment. The laminated body 10 formed of the high voltage electrode 11, ground electrodes 12, dielectric bodies 13, and the like, is formed in the same configuration as in Embodiment 1. In this embodiment, in the catalyst plasma integral part, a catalyst layer 21 is formed on the downward side of each dielectric body 13. For each dielectric body 13, for example a plate-like ceramics can be used. On the surface of the ceramics, for example, a noble metal catalyst of platinum, palladium, iridium, ruthenium, gold, silver, or the like can be applied to form each catalyst layer 21. Alternatively, particles of a porous catalyst such as porous alumina, zeolite, or titanium oxide can also be applied to form each catalyst layer 21. Further, the noble metal catalyst can also be carried on the porous catalyst to use the porous catalyst and the noble metal catalyst in combination. For the high voltage electrode 11 and the ground electrodes 12, as with Embodiment 1, a punching metal made of stainless steel can also be used. Incidentally, in this embodiment, the catalyst layer 21 is formed over the entire surface of the downward side of each dielectric body 13. Whereas, at the portions interposed between the convex parts 11b and 12b of the high voltage electrode 11 and the ground electrode 12 and each dielectric body 13, the catalyst layer 21 is not required to be formed. This is because of the following reasons: an exhaust gas does not come in contact with the portions at which the dielectric bodies 14 and the electrodes are in contact with each other, and hence the catalyst layer 21 is not required to be formed; and there is also produced an effect of preventing the catalyst forming the catalyst layer 21 from falling due to vibration of the dielectric bodies 13 and the electrodes.

With the exhaust gas purification device thus configured, the catalyst layer 21 is formed on one surface of each dielectric body 13 of the catalyst plasma integral part 20. Therefore, when an exhaust gas flows through the gap part 14, $NO_x$ and highly reactive hydrocarbons such as aldehyde come in contact with the catalyst layer 21, and are purified. At this step, some aldehyde and the like are oxidized by OH* (OH radicals) and O* (O radicals) having a strong oxidizing power generated from oxygen and water vapor in the exhaust gas with the plasma reaction. On the other hand, low reactive hydrocarbons such as saturated hydrocarbons and aromatic hydrocarbons are converted into highly reactive hydrocarbons such as aldehyde by the plasma reaction. The highly reactive hydrocarbons immediately react with the catalyst of the catalyst layer 21 present in the same space, and are purified.

On the other hand, when a catalyst layer is not formed at the catalyst plasma integral part as in this embodiment, namely, when in Embodiment 1, the first nitrogen oxide selective reducing catalyst part is removed, and the plasma discharge part is disposed on the uppermost stream part, OH* (OH radical) and O* (O radical) having a strong oxidizing power formed from oxygen and water vapor in the exhaust gas by the plasma reaction oxidize and consume highly reactive hydrocarbons contained in the exhaust gas. As a result, highly reactive hydrocarbons to be fed to the second nitrogen oxide selective reducing catalyst part 4 mostly disappear. Therefore, in the second nitrogen oxide selective reducing catalyst part 4, a part of $NO_x$ and HC cease to be converted into $N_2$, $CO_2$, $H_2O$, and the like. This results in reduction of the purification efficiency.

As in this embodiment, the first nitrogen oxide selective reducing catalyst part and the plasma discharge part are integrated to form the catalyst plasma integrated part. As a result, as with Embodiment 1, at the second nitrogen oxide selective reducing catalyst part, residual $NO_x$ are efficiently reduced with highly reactive hydrocarbons. At the lowermost stream reducing agent purification catalyst part, the entire amount of residual hydrocarbons are allowed to react to purify harmful gases. Therefore, it is possible to improve the purification ratio of the harmful components contained in the exhaust gas.

Further, in this embodiment, the first nitrogen oxide selective reducing catalyst part and the plasma discharge part are integrated to form the catalyst plasma integrated part. Therefore, it becomes possible to reduce the size of the device. In addition, no gas passage is present between the catalyst layer and the plasma discharge part, and hence exhaust gas components will not be adsorbed on the tube wall of the exhaust gas passage slightly formed in Embodiment 1.

Incidentally, in this embodiment, the catalyst layers 21 are formed on only downward sides of the dielectric bodies 13. However, the catalyst layers may also be formed on opposite sides of each dielectric body 13. Alternatively, the catalyst layers may be formed on only the side of the dielectric body corresponding to each gap part 14 inside the laminated body 10 on the upstream part of the catalyst plasma integrated part.

Still alternatively, the following is also acceptable: the coating density of the catalyst of the catalyst layers 21 is allowed to have a distribution, so that the coating density of the catalyst of the catalyst layer at the upstream part is set larger than at the downstream part. Control of the coating density becomes possible by, for example, setting the thickness of the catalyst layer large at the upstream part and small at the downstream part, or setting the coating concentration of the catalyst layer high at the upstream part and low at the downstream part. With such a configuration, $NO_x$ and HC in the exhaust gas react at the catalyst layer 21 at the upstream part, and are purified. Subsequently, $NO_x$ and HC flow into the plasma space at the downstream part where no catalyst layer 21 is formed, or the thickness of the catalyst layer 21 is smaller than at the upstream part. This results in an increase in the proportion of reaction of new highly reactive HC and $NO_x$ formed by the plasma discharge. Accordingly, purification of $NO_x$ is further promoted.

Embodiment 3

In Embodiment 2, the temperature of the catalyst plasma integrated part is not particularly controlled. However, for the temperature of the catalyst of the catalyst layer and the $NO_x$ purification ratio, there is the optimum temperature region as shown in FIG. 3 of Embodiment 1. In Embodiment 3, a temperature sensor is set at the catalyst plasma integrated part. Thus, the plasma control device and the high voltage power source are controlled based on the temperature of the catalyst plasma integrated part detected by the temperature sensor.

The operation of this embodiment will be specifically described. After start of the engine, the temperature of the exhaust gas gradually increases. Accordingly, the temperature of the catalyst plasma integrated part increases. When the temperature detected by the temperature sensor reaches, for example, 400° C., the high voltage power source is controlled to reduce the plasma electric power of the catalyst plasma integrated part. Thus, the temperature increase is controlled. Conversely, when the temperature of the exhaust gas decreases with a decrease in the number of revolutions of the engine, or the like, and the temperature of the catalyst plasma integrate part accordingly decreases, the high voltage power source is controlled to increase the plasma electric power of the catalyst plasma integrated part. Thus, the temperature of the catalyst plasma integrated part is controlled so as to be kept within a given range, for example, 280 to 400° C. (in the curve a of FIG. 3, the temperature range for the $NO_x$ purification ratio of 80% or more).

With the exhaust gas purification device thus controlled, the temperature of the catalyst layer of the catalyst plasma integrated part can be kept within the temperature range for a high purification ability. Therefore, even when the temperature of the exhaust gas changes based on the state of the operation of the engine, a high purification ability can be exerted.

Embodiment 4

Figure 8:
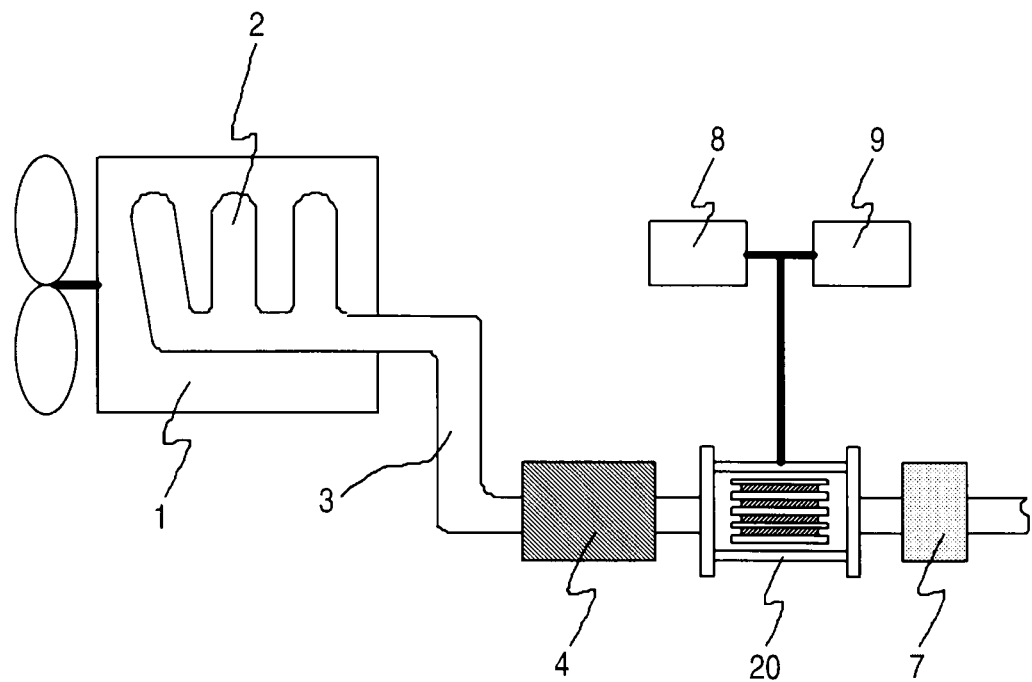
FIG. 8 is a block view of an exhaust gas purification device in Embodiment 4 of this invention.

FIG. 8 is a block view of an exhaust gas purification device in accordance with Embodiment 4 for carrying out this invention and shows the state of the device being connected to, for example, an engine for a car. In this embodiment, a catalyst plasma integral part 20 including the plasma discharge part and the second nitrogen oxide selective reducing catalyst part described in Embodiment 1 integrated therein is provided in place of them in the exhaust gas passage 3. In the exhaust gas passage 3, the first nitrogen oxide selective reducing catalyst part 4, the catalyst plasma integrated part 20, and the reducing agent purification catalyst part 7 are provided in this order from upstream. To the catalyst plasma integral part 20, the plasma control device 8 and the high voltage power source 9 are connected. The plasma control device 8 monitors the state of generation of plasma of the catalyst plasma integral part 20, and controls the high voltage power source 9 based on information such as the number of revolutions of the engine 1 and the exhaust gas temperature, and controls the amount of plasma generated from the catalyst plasma integral part 20. the catalyst plasma integrated part 20 has the same configuration as that of the catalyst plasma integrated part described in Embodiment 2.

With the exhaust gas purification device thus configured, an exhaust gas from the engine 1 is introduced at a proper temperature to the first nitrogen oxide selective reducing catalyst part 4. Then, $NO_x$ and HC such as aldehydes and alcohols excellent in reactivity contained in the exhaust gas react. Thus, the purification treatment proceeds, so that $NO_x$ and HC are partly efficiently converted into $N_2$, $CO_2$, and $H_2O$. At the outlet of the first nitrogen oxide selective reducing catalyst part 4, aldehydes and alcohols mostly disappear, and other saturated hydrocarbons and aromatic hydrocarbons have been left. The exhaust gas containing such components is introduced to the catalyst plasma integrated part 20. Then, formaldehyde, acetaldehyde, $NO_2$, or the like is formed from saturated hydrocarbons, aromatic hydrocarbons, and NO by the plasma reaction. The highly reactive hydrocarbons (formaldehyde and acetaldehyde) serving as a reducing agent, and oxidizing gas ($NO_2$) immediately react with the catalyst layer present in the same space, and are purified.

As in this embodiment, the second nitrogen oxide selective reducing catalyst part and the plasma discharge part are integrated to form the catalyst plasma integrated part. As a result, as with Embodiment 1, at the first nitrogen oxide selective reducing catalyst part, almost the entire amount of highly reactive hydrocarbons are used for reduction of $NO_x$. Therefore, at the catalyst plasma integrated part 22, the highly reactive hydrocarbons will not be consumed ineffectively.

Further, in this embodiment, the plasma discharge part and the second nitrogen oxide selective reducing catalyst part are integrated to form the catalyst plasma integrated part. Therefore, it becomes possible to reduce the size of the device. In addition, no gas passage is present between the catalyst layer and the plasma discharge part, and hence exhaust gas components will not be adsorbed on the tube wall of the exhaust gas passage slightly formed in Embodiment 1. Further, in Embodiment 1, an exhaust gas flows from upstream to downstream in the gas passage, during which the exhaust gas temperature gradually decreases. Thus, the second nitrogen oxide selective reducing catalyst part may be at a lower temperature than the temperature range at which the purification ratio of the catalyst layer is high. However, in this embodiment, the plasma discharge part and the second nitrogen oxide selective reducing catalyst part are integrated to form the catalyst plasma integrated part. Therefore, the temperature of the catalyst layer increases with heat generated from plasma discharge. For this reason, there is also produced an effect of capable of increasing the purification ratio of the catalyst layer.

Incidentally, a temperature sensor is set at the catalyst plasma integrated part. The temperature of the catalyst plasma integrated part is detected by the temperature sensor. Thus, as described in Embodiment 3, the temperature of the catalyst layer of the catalyst plasma integrated part is controlled so as to be kept within a given temperature range. As a result, even when the temperature of the exhaust gas changes based on the state of the operation of the engine, a high purification ability can be exerted.

Incidentally, the exhaust gas purification devices of Embodiments 1 to 4 were each described as the one for purifying harmful components of an exhaust gas discharged from a lean burn engine for gasoline. However, the invention is not limited thereto, but is also applicable to exhaust gases from diesel engines, engines for shipping, and other combustion apparatuses.

What is claimed is:

1. An exhaust gas purification device comprising: in an exhaust gas passage for a combustion exhaust gas containing a nitrogen oxide, a hydrocarbon, and an oxygen in a larger amount than a theoretical reaction amount with respect to the hydrocarbon to flow therethrough, in order from upstream,
   a cooling fan for cooling the exhaust gas passage;
   a first catalyst part for selectively reducing a nitrogen oxide;
   a plasma discharge part for generating a plasma;
   a second catalyst part for selectively reducing a nitrogen oxide; and
   a purifying catalyst part for purifying a reducing agent;
   wherein the temperature of the first catalyst part is set by the cooling fan at a lower temperature than a temperature at which an entire amount of the hydrocarbon flowing in the flowing combustion exhaust gas is oxidized.

2. The exhaust gas purification device according to claim 1, wherein the plasma discharge part includes a temperature sensor, and
   wherein an electric power supplied to the plasma discharge part is controlled according to the temperature detected by the temperature sensor such that the temperature of the plasma discharge part is kept within a prescribed temperature range.

3. The exhaust gas purification device according to claim 1, wherein the first catalyst part and the second catalyst part each comprises a silver catalyst carried on alumina, or a noble metal selected from the group consisting of platinum, palladium, iridium, ruthenium and gold, or a porous catalyst selected from the group consisting of porous alumina, zeolite and titanium oxide.

4. The exhaust gas purification device according to claim 1, wherein the purifying catalyst part comprises a catalyst carrying a noble metal selected from the group consisting of platinum, palladium, iridium and ruthenium.

5. The exhaust gas purification device according to claim 1, wherein the first catalyst part is set at a temperature lower than about 430° C.

6. The exhaust gas purification device according to claim 1, wherein a combustion exhaust gas which is not treated with plasma flows into the first catalyst part.

7. The exhaust gas purification device according to claim 1, wherein at least one of the first catalyst part and the second catalyst part is integrated with the plasma discharge part to form a catalyst plasma integrated part, and
   wherein a temperature of the catalyst plasma integrated part is set at a lower temperature than the temperature at which the purification ratio of the flowing nitrogen oxide becomes the maximum value.

8. The exhaust gas purification device according to claim 7, wherein the catalyst plasma integrated part includes a discharge electrode comprising two opposing electrodes and a dielectric body,
   wherein a catalyst for selectively reducing a nitrogen oxide is attached to a surface of the dielectric body, and
   wherein a voltage is applied between the two electrodes, thereby to generate a plasma.

9. The exhaust gas purification device according to claim 7, wherein the catalyst plasma integrated part includes a temperature sensor, and
   wherein an electric power supplied to the catalyst plasma integrated part is controlled according to the temperature detected by the temperature sensor such that the temperature of the catalyst plasma integrated part is kept within a prescribed temperature range.

10. The exhaust gas purification device according to claim 7, wherein the first catalyst part is integrated with the plasma discharge part to form a catalyst plasma integrated part.

11. The exhaust gas purification device according to claim 7, wherein the second catalyst part is integrated with the plasma discharge part to form a catalyst plasma integrated part.

* * * * *